(12) United States Patent
Yasuhiko et al.

(10) Patent No.: US 7,889,441 B2
(45) Date of Patent: Feb. 15, 2011

(54) LENS SYSTEM

(75) Inventors: Abe Yasuhiko, Changwon (KR); Tetsusuke Kusakawa, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 0 days.

(21) Appl. No.: 12/705,802

(22) Filed: Feb. 15, 2010

(65) Prior Publication Data

US 2010/0208363 A1     Aug. 19, 2010

(30) Foreign Application Priority Data

Feb. 16, 2009     (KR) ...................... 10-2009-0012228

(51) Int. Cl.
*G02B 13/18*     (2006.01)
*G02B 9/34*      (2006.01)

(52) U.S. Cl. ...................................... 359/715; 359/773

(58) Field of Classification Search ......... 359/713–715, 359/773
See application file for complete search history.

(56) References Cited

U.S. PATENT DOCUMENTS

2008/0180816 A1*   7/2008   Nakamura ................... 359/773

FOREIGN PATENT DOCUMENTS

| JP | 2002-365529 A | 12/2002 |
| JP | 2005-208236 A | 4/2005 |
| JP | 2008-185880 A | 8/2008 |
| KR | 10-2008-0076207 A | 8/2008 |

* cited by examiner

*Primary Examiner*—Scott J Sugarman
(74) *Attorney, Agent, or Firm*—Sughrue Mion, PLLC (57) ABSTRACT

A lens system including sequentially, from an object side to an image side, a first lens of a biconvex type having two aspherical surfaces, a second lens of a biconcave type having at least one aspherical surface, a third lens having two aspherical surfaces and having a positive refracting power, and a fourth lens having two aspherical surfaces and having a negative refracting power.

13 Claims, 10 Drawing Sheets

LENS SYSTEM

CROSS-REFERENCE TO RELATED PATENT APPLICATION

This application claims priority from Korean Patent Application No. 10-2009-0012228, filed on Feb. 16, 2009, in the Korean Intellectual Property Office, the disclosure of which is incorporated herein in its entirety by reference.

BACKGROUND

1. Field

Exemplary embodiments relate to a lens system which is compact and thin.

2. Description of the Related Art

Digital still cameras (DSCs) including a solid state imaging device such as a charge coupled device (CCD) or a complementary metal-oxide semiconductor (CMOS), or digital video cameras (DVCs) are widely used. In particular, demands for camera modules having mega-pixels resolution have increased, and cameras having picture resolution higher than 5,000,000 pixels are frequently employed. Imaging optical devices such as DSCs using a CCD or a CMOS, or mobile phone cameras are required to have small size, light weight, and low manufacturing costs. Furthermore, when video communications are performed using mobile phones cameras, the cameras must be small.

As solid state imaging devices have been developed, an exit angle of main light (hereinafter, referred to as an exit angle) is 20° to 25°. Also, a plurality of thin and small-sized lenses have been developed.

In addition, a pitch of a plurality of pixels of a solid state imaging device needs to be less than 1.75 μm, and resolution of a lens system of the solid state imaging device needs to be improved. Furthermore, demands for making the solid state imaging device thin have also increased. However, with respect to the pitch of a plurality of pixels that is less than 1.75 μm, color aberration is not sufficiently corrected, and thus, a desired resolution of the lens system of the solid state imaging device is not easily obtained.

Resolution may be increased even with respect to the pitch of a plurality of pixels that is less than 1.75 μm by correcting color aberration. However, in this case, the overall length of the lens system is increased as compared to a diagonal length of the conventional solid state imaging device, and thus, the demand for miniaturization is not satisfied.

For miniaturization, a back focal length may be reduced. However, when the back focal length is greatly decreased, a space in which glass material may be inserted in a rear portion of an infrared ray (IR) cutoff filter may not be obtained, or an assembling margin may be reduced.

When an exit angle is increased, the solid state imaging device may be easily manufactured with thin dimensions. In this case, a shading characteristic of the lens system may be lowered.

Thus, it is difficult to satisfy both the demand for improved resolution of the lens system and the demand for making the lens system thin.

SUMMARY

Exemplary embodiments provide an imaging lens system that has improved resolution and exhibits thin dimensions.

According to an aspect of an exemplary embodiment, there is provided a lens system including sequentially, from an object side, a first lens of a biconvex type having two aspherical surfaces, a second lens of a biconcave type having at least one aspherical surface, a third lens having two aspherical surfaces and having a positive refracting power, and a fourth lens having two aspherical surfaces and having a negative refracting power, wherein an aspherical shape of an image side of the fourth lens comprises an inflection point within an effective range and wherein the lens system satisfies the following Equations:

$$|L1R1|>|L1R2|$$

$$0.8<|L1R2|/|L2R2|<1.1,$$

where L1R1 is a radius of curvature of the object side of the first lens, L1R2 is a radius of curvature of the image side of the first lens, and L2R2 is a radius of curvature of the image side of the second lens.

The lens system may satisfy the following Equation:

$$1.0<f/|f2|<2.0,$$

where f is a focal length of an overall lens system, and f2 is a focal length of the second lens.

The lens system may satisfy the following Equations:

$$0.7<|f1/f2|<1.1$$

$$0.7<|f3/f4|<1.2,$$

where f1 is a focal length of the first lens, f2 is a focal length of the second lens, f3 is a focal length of the third lens, and f4 is a focal length of the fourth lens.

The lens system may satisfy the following Equations:

$$v1-v2>15$$

$$0.9<v3/v4<1.1,$$

where v1 is an Abbe's number of the first lens, v2 is an Abbe's number of the second lens, v3 is an Abbe's number of the third lens, and v4 is an Abbe's number of the fourth lens.

A stop may be disposed at the object side surface of the first lens or in front of the first lens.

BRIEF DESCRIPTION OF THE DRAWINGS

The above and other aspects will become more apparent by describing in detail exemplary embodiments with reference to the attached drawings in which.

DETAILED DESCRIPTION

Hereinafter, exemplary embodiments will be described in detail with reference to the attached drawings. The attached drawings are referred to in order to provide a sufficient understanding of such embodiments, the merits thereof, and the objectives accomplished by the implementation of such embodiments. Like reference numerals in the drawings denote like elements.

Figure 1:
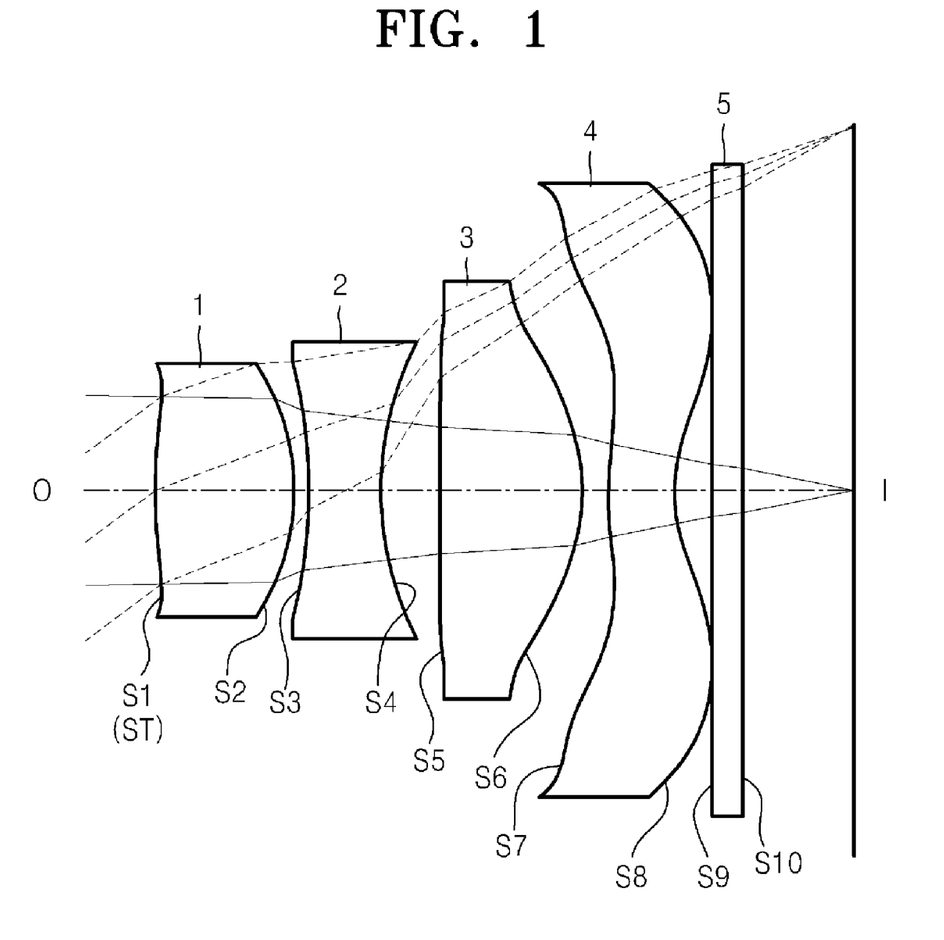
FIG. 1 is a cross-sectional view of a lens system according to an exemplary embodiment.

FIG. 1 is a cross-sectional view of an imaging lens system according to an exemplary embodiment. Referring to FIG. 1, the imaging lens system sequentially includes, from an object side O to an image side I, a first lens 1, a second lens 2, a third lens 3, and a fourth lens 4. A filter 5 may be disposed on the image side I of the fourth lens 4.

A stop ST having a predetermined aperture is disposed at the object side surface of the first lens 1 or in front of the first lens 1. The first lens 1 may be a biconvex lens having two aspherical surfaces. The second lens 2 may be a biconcave lens having at least one aspherical surface. The third lens 3 has two aspherical surfaces and a positive refracting power. The fourth lens 4 has two aspherical surfaces and a negative refracting power.

An exemplary embodiment provides an imaging lens system having resolution that may correspond to a pitch of a plurality of pixels that is less than 1.75 μm, T/D (which is the ratio of a diagonal dimension D of a solid state imaging device to the overall length T of the imaging lens system) of less than 1, and a very small thickness. The overall length of the lens system is the distance from a surface near the object side O at a peak portion of the object side O of the stop ST or the first lens 1 to a focal position (which is an air calculation distance from which glass material to be inserted in a rear portion of the filter 5 is excluded). Also, a sufficient back focal length Bf (0.95 mm or more including glass material to be inserted in the rear portion of the filter 5) is obtained so that a shading characteristic of the imaging lens system may not be lowered. An exemplary embodiment also provides an imaging lens system in which an exit angle is reduced by about 20° to about 25° so that a viewing angle of more than 70° can be obtained.

An aspherical shape of the image side I of the fourth lens 4 may include an inflection point within an effective range and may satisfy the following Equations 1 and 2. The effective range is an effective aperture range, and the inflection point is a point at which a tangential plane angle formed by an aspherical surface is gradually increased or decreased from an optical axis to a circumferential portion of the imaging lens system and vice versa.

$$|L1R1|>|L1R2| \tag{1}$$

$$0.8<|L1R2|/|L2R2|<1.1 \tag{2}$$

In Equations 1 and 2, L1R1 is a radius of curvature of the object side O of the first lens 1, L1R2 is a radius of curvature of the image side I of the first lens 1, and L2R2 is a radius of curvature of the image side I of the second lens 2.

When Equations 1 and 2 are satisfied, all aberrations are corrected while obtaining a viewing angle of more than 70° (a half-viewing angle 35° or more) so that desired resolution, a desired back focal length Bf, a desired T/D and a desired exit angle may be obtained. Further, the overall length of the imaging lens system is reduced, and the exit angle is reduced so that a proper back focal length and a viewing angle of 70° may be obtained. It is known that aberrations may be usually corrected by the stop ST disposed between the first lens 1 and the second lens 2. However, when the stop ST is disposed between the first lens 1 and the second lens 2, the position of an exit pupil is short, and the exit angle is increased with respect to a lens system having a same overall length. Also, when the increased exit angle is corrected, the overall length of the lens system is increased so that a thin and small-sized imaging lens system may not be provided.

The imaging lens system according to the present exemplary embodiment is constituted to satisfy the above Equations 1 and 2 so that a viewing angle of 70° or more may be obtained and aberrations may be easily corrected. When the above Equations 1 and 2 are not satisfied, the viewing angle of 70° or more may not be obtained and aberrations may not be easily corrected.

Also, all aberrations may be efficiently improved using an aspherical surface as each lens surface. Aberration near the optical axis is efficiently corrected by aspherical surfaces of the first lens 1 and the second lens 2, and aberration at a circumferential portion of the optical axis is efficiently corrected by aspherical surfaces of the third lens 3 and the fourth lens 4.

The aspherical shape of the image side I of the fourth lens 4 has an inflection point so that deterioration of aberration at the circumferential portion of the optical axis caused by a reduction in the overall length of the lens system may be corrected and the exit angle may be corrected.

Next, an imaging lens system according to another exemplary embodiment may satisfy the following Equation 3:

$$1.0<f/|f2|<2.0, \tag{3}$$

In Equation 3, f is a focal length of the imaging lens system, and f2 is a focal length of the second lens 2. When the above Equation 3 is satisfied, the overall length of the imaging lens system may be reduced, and a proper back focal length may be obtained. When the above Equation 3 is not satisfied, it is not easy to reduce the overall length of the imaging lens system or to obtain a proper back focal length by correcting color aberration or spherical aberration.

An imaging lens system according to another exemplary embodiment may satisfy the following Equation 4 and Equation 5:

$$0.7<f1/|f2|<1.1 \tag{4}$$

$$0.7<f3/|f4|<1.2, \tag{5}$$

In Equations 4 and 5, f1 is a focal length of the first lens 1, f2 is a focal length of the second lens 2, f3 is a focal length of the third lens 3, and f4 is a focal length of the fourth lens 4.

When the above Equations 4 and 5 are satisfied, several aberrations may be more easily corrected. For example, when Equation 4 is satisfied, the overall length of the imaging lens system may be reduced, and aberration near the optical axis may be easily corrected. Further, when Equation 5 is satisfied, aberration at the circumferential portion of the optical axis may be easily corrected. When Equations 4 and 5 are not satisfied, it is not easy to reduce the imaging lens system and to correct several aberrations while having a desired exit angle.

An imaging lens system according to another exemplary embodiment may satisfy the following Equation 6 and/or Equation 7:

$$v1-v2>15 \tag{6}$$

$$0.9<v3/v4<1.1 \tag{7}$$

In Equations 6 and 7, ν1 is the Abbe's number of the first lens 1, ν2 is the Abbe's number of the second lens 2, ν3 is the Abbe's number of the third lens 3, and ν4 is the Abbe's number of the fourth lens 4. When the above Equations 6 and 7 are satisfied, color aberration may be easily corrected. When Equation 6 is satisfied, both axial color aberration and magnification color aberration may be easily corrected.

Equation 7 involves correction of color aberration of magnification in all regions of the imaging lens system. When Equation 7 is not satisfied, magnification color aberration at a middle portion of the imaging lens system is easily corrected, but magnification color aberration at an outermost circumferential portion of the imaging lens system is not easily corrected, and vice versa.

The term 'aspherical' mentioned in the above-described exemplary embodiments may be defined as follows, for example, but is not limited to the following definition.

When a direction of the optical axis is an x-axis, a direction that is perpendicular to the direction of the optical axis and a proceeding direction of light is a positive direction, the aspherical shape of the imaging lens system according to exemplary embodiments may be expressed by the following Equation 8:

$$x = \frac{cy^2}{1+\sqrt{1-(K+1)c^2 y^2}} + Ay^4 + By^6 + Cy^8 + Dy^{10} \quad (8)$$

In Equation 8, x is a distance from a vertex of a lens to the direction of the optical axis, y is a distance from the vertex of the lens to the direction perpendicular to the optical axis, K is a conic constant, A, B, C, and D are aspherical coefficients, and c is a reverse number 1/R of a curvature radius at the vertex of the lens.

Hereinafter, exemplary embodiments according to various designs will be described.

Figure 2:
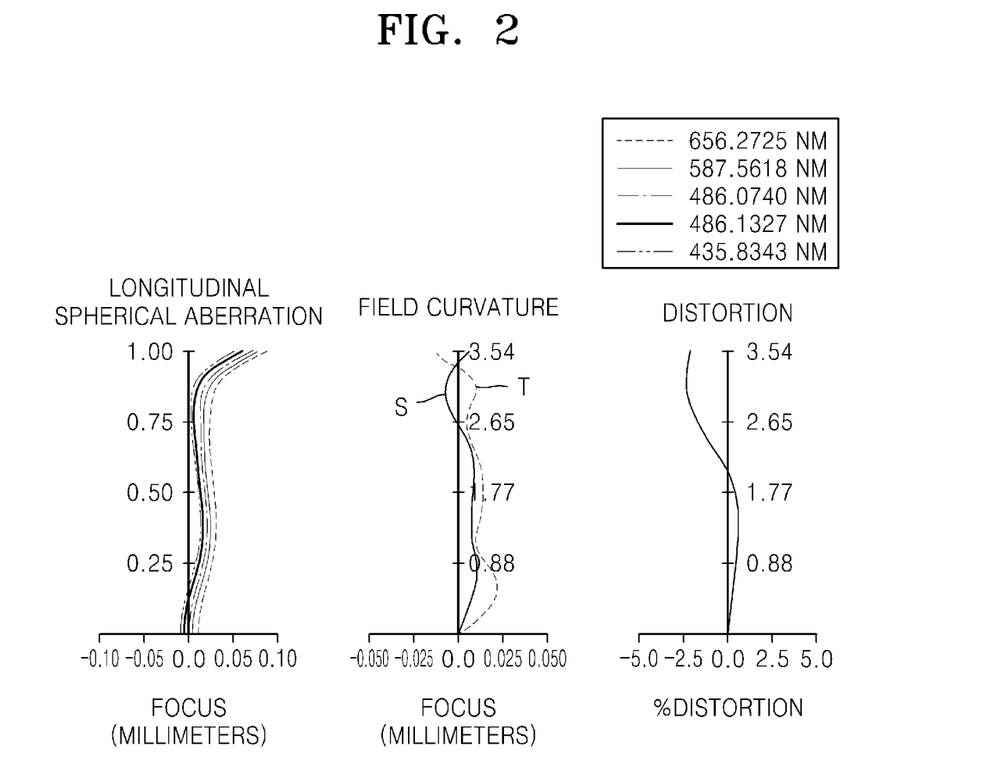
FIG. 2 is a chart illustrating longitudinal spherical aberration, field curvature, and distortion of the lens system of FIG. 1.

FIG. 1 is a cross-sectional view of a lens system according to an exemplary embodiment. FIG. 2 is a chart illustrating longitudinal spherical aberration, field curvature (including sagittal field curvature "S" and tangential field curvature "T"), and distortion of the lens system of FIG. 1. Design specifications relating to the exemplary embodiment according to FIGS. 1-2 are provided below.

Object distance: Infinity,
Focal length: 4.905 mm,
FNo: 2.69
Half viewing angle: 36.3°
Exit angle: 23.7°
Bf (Air calculation): 1.649 mm
Bf (including rear glass): 1.752 mm
T/D: 6.804/7.07=0.962

$|L1R1|>|L1R2|\rightarrow|5.4137|>|-2.5751|$ (Equation 1)

$0.8<|L1R2|/|L2R2|<1.1\rightarrow|-2.5751|/|2.5077|=1.027$ (Equation 2)

$1.0<f/|f2|<2.0\rightarrow 4.905/|-2.8687|=1.710$ (Equation 3)

$0.7<f1/|f2|<1.1\rightarrow|2.6926|/|-2.8687|=0.939$ (Equation 4)

$0.7<f3/|f4|<1.2\rightarrow|3.5577|/|-4.2225|=0.843$ (Equation 5)

$\nu1-\nu2>15\rightarrow 53.2-31.2=22.0$ (Equation 6)

$0.9<\nu3/\nu4<1.1\rightarrow 56.5/56.5=1.0$ (Equation 7)

| | Radius of curvature | Interval | Refractive index | Abbe's number |
|---|---|---|---|---|
| S1(ST) | 5.4137(aspherical) | 1.3550 | 1.69350 | 53.2 |
| S2 | −2.5751(aspherical) | 0.1299 | | |
| S3 | −10.7993(aspherical) | 0.7144 | 1.68893 | 31.2 |
| S4 | 2.5077(aspherical) | 0.5780 | | |
| S5 | −26.9203(aspherical) | 1.3799 | 1.53120 | 56.5 |
| S6 | −1.8043(aspherical) | 0.2526 | | |
| S7 | 3.1338(aspherical) | 0.6424 | 1.53120 | 56.5 |
| S8 | 1.2170(aspherical) | 0.3730 | | |
| S9 | INFINITY | 0.3000 | 1.51680 | 64.2 |
| S10 | INFINITY | 1.0789 | | |
| IMG | INFINITY | 0.000 | | |

Asphercial Coefficients:

S1 K: −92.045700
A: 0.469987E−01   B: −0.816975E−01   C: 0.570241E−01
D: −0.245192E−01
S2 K: −1.953600
A: −0.575322E−01   B: 0.373684E−01   C: −0.194362E−01
D: 0.167264E−02
S3 K: 38.448500
A: −0.876727E−01   B: 0.808933E−01   C: −0.329568E−01
D: 0.467278E−02
S4 K: −6.598400
A: −0.755307E−02   B: 0.160916E−01   C: −0.463016E−02
D: 0.382715E−03
S5 K: 118.416300
A: 0.252424E−01   B: −0.177707E−01   C: 0.713316E−02
D: −0.919027E−03
S6 K: −6.128700
A: −0.591461E−01   B: 0.347283E−01   C: −0.153311E−01
D: 0.389272E−02   E: −0.352452E−03
S7 K: −21.303500
A: −0.641858E−01   B: 0.671696E−02   C: 0.390142E−03
D: −0.593522E−04
S8 K: −4.464100
A: −0.463899E−01   B: 0.806727E−02   C: −0.110297E−02
D: 0.856988E−04   E: −0.285620E−05

Figure 3:
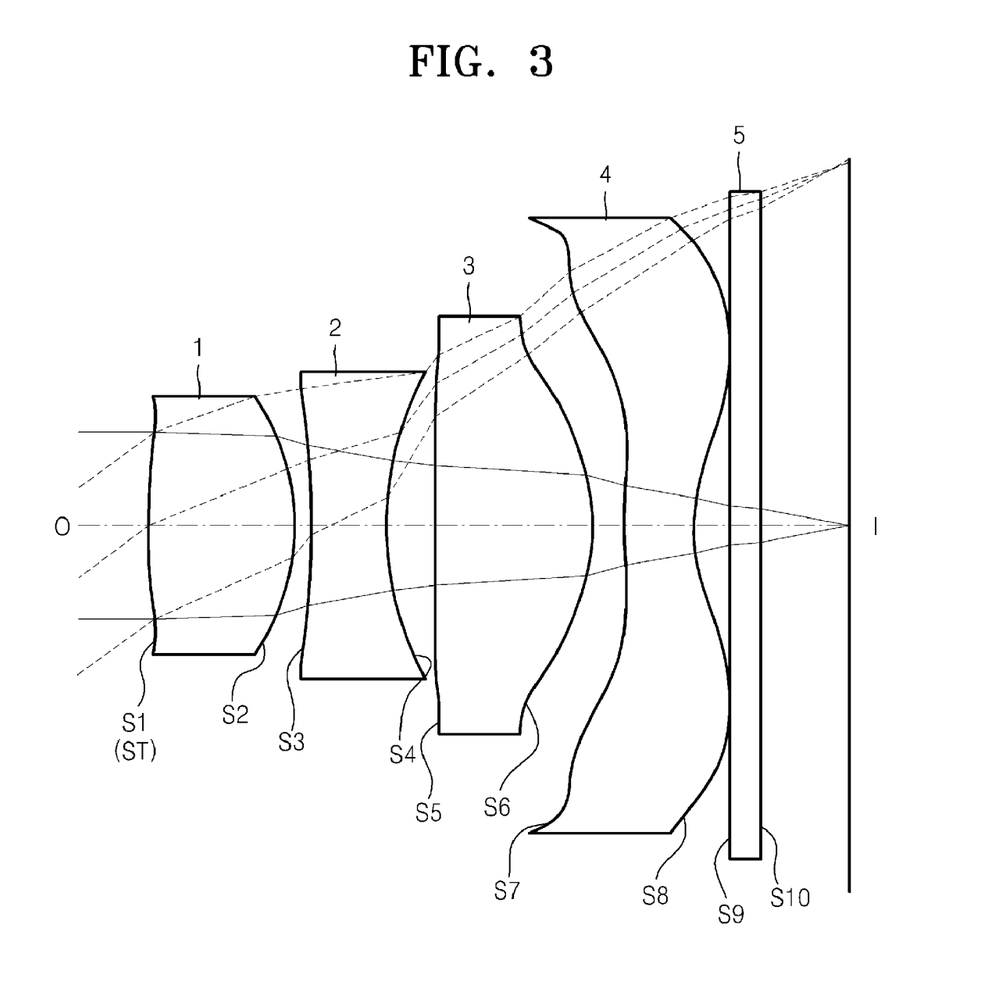
FIG. 3 is a cross-sectional view of a lens system according to another exemplary embodiment.
Figure 4:
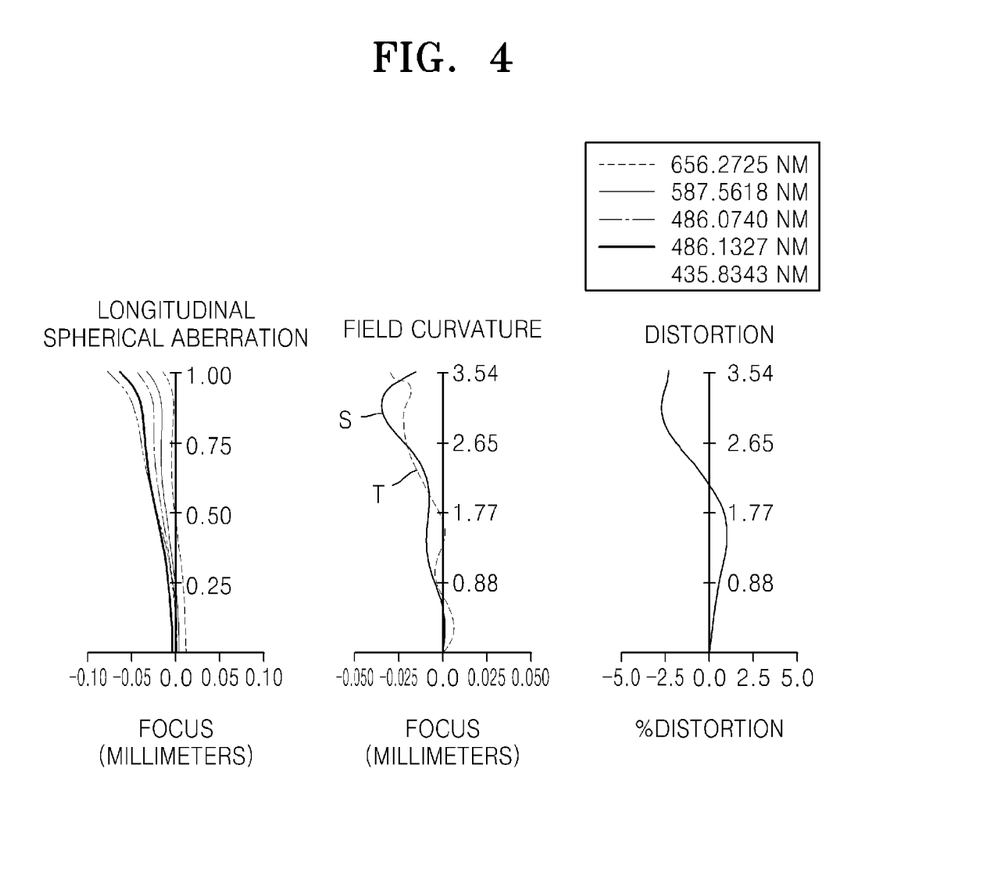
FIG. 4 is a chart illustrating longitudinal spherical aberration, field curvature, and distortion of the lens system of FIG. 3.

FIG. 3 is a cross-sectional view of a lens system according to another exemplary embodiment. FIG. 4 is a chart illustrating longitudinal spherical aberration, field curvature (including sagittal field curvature "S" and tangential field curvature "T"), and distortion of the lens system of FIG. 3. Design specifications relating to the exemplary embodiment according to FIGS. 3-4 are provided below.

Object distance: Infinity,
Focal length: 4.884 mm,
FNo: 2.69
Half viewing angle: 36.5°
Exit angle: 23.3°
Bf (Air calculation): 1.426 mm
Bf (including rear glass): 1.529 mm
T/D: 6.857/7.07=0.970

$|L1R1|>|L1R2|\rightarrow|5.4768|>|-2.2394|$ (Equation 1)

$0.8<|L1R2|/|L2R2|<1.1\rightarrow|-2.2394|/|2.6433|=0.847$ (Equation 2)

$1.0<f/|f2|<2.0\rightarrow 4.884/|-2.9896|=1.634$ (Equation 3)

$0.7<f1/|f2|<1.1\rightarrow|2.7367|/|-2.9896|=0.915$ (Equation 4)

$0.7<f3/|f4|<1.2\rightarrow|3.3592|/|-3.4769|=0.966$ (Equation 5)

$\nu1-\nu2>15\rightarrow 58.2-31.2=27.0$ (Equation 6)

$0.9<\nu3/\nu4<1.1\rightarrow 56.5/56.5=1.005$ (Equation 7)

|  | Radius of curvature | Interval | Refractive index | Abbe's number |
|---|---|---|---|---|
| S1(ST) | 5.47680(aspherical) | 1.4238 | 1.62263 | 58.2 |
| S2 | −2.23940(aspherical) | 0.1651 |  |  |
| S3 | −10.77040 | 0.7438 | 1.68893 | 31.2 |
| S4 | 2.64330(aspherical) | 0.4632 |  |  |
| S5 | −126.61620(aspherical) | 1.5500 | 1.53120 | 56.5 |
| S6 | −1.77430(aspherical) | 0.3093 |  |  |
| S7 | 5.56040(asphercial) | 0.6732 | 1.54353 | 56.2 |
| S8 | 1.35560(aspherical) | 0.3620 |  |  |
| S9 | INFINITY | 0.3000 | 1.51680 | 64.2 |
| S10 | INFINITY | 0.8668 |  |  |
| IMG | INFINITY | 0.000 |  |  |

Aspherical Coefficients:

S1 K: −5.971000
A: −0.148410E−01  B: −0.773701E−02  C: −0.159032E−02
D: −0.815203E−03
S2 K: −5.763100
A: −0.366858E−01  B: 0.297241E−02  C: −0.314422E−02
D: 0.000000E+00
S4 K: −3.245500
A: −0.114860E−01  B: 0.117678E−01  C: −0.340949E−02
D: 0.401634E−03
S5 K: 4934.876400
A: 0.139968E−01  B: −0.122754E−01  C: 0.652061E−02
D: −0.103797E−02
S6 K: −6.159500
A: −0.650095E−01  B: 0.362390E−01  C: −0.158280E−01
D: 0.411881E−02  E: −0.380797E−03
S7 K: −48.642400
A: −0.699085E−01  B: 0.680381E−02  C: 0.785539E−03
D: −0.970458E−04
S8 K: −4.515200
A: −0.427646E−01  B: 0.736195E−02  C: −0.104778E−02
D: 0.823650E−04  E: −0.262300E−05

Figure 5:
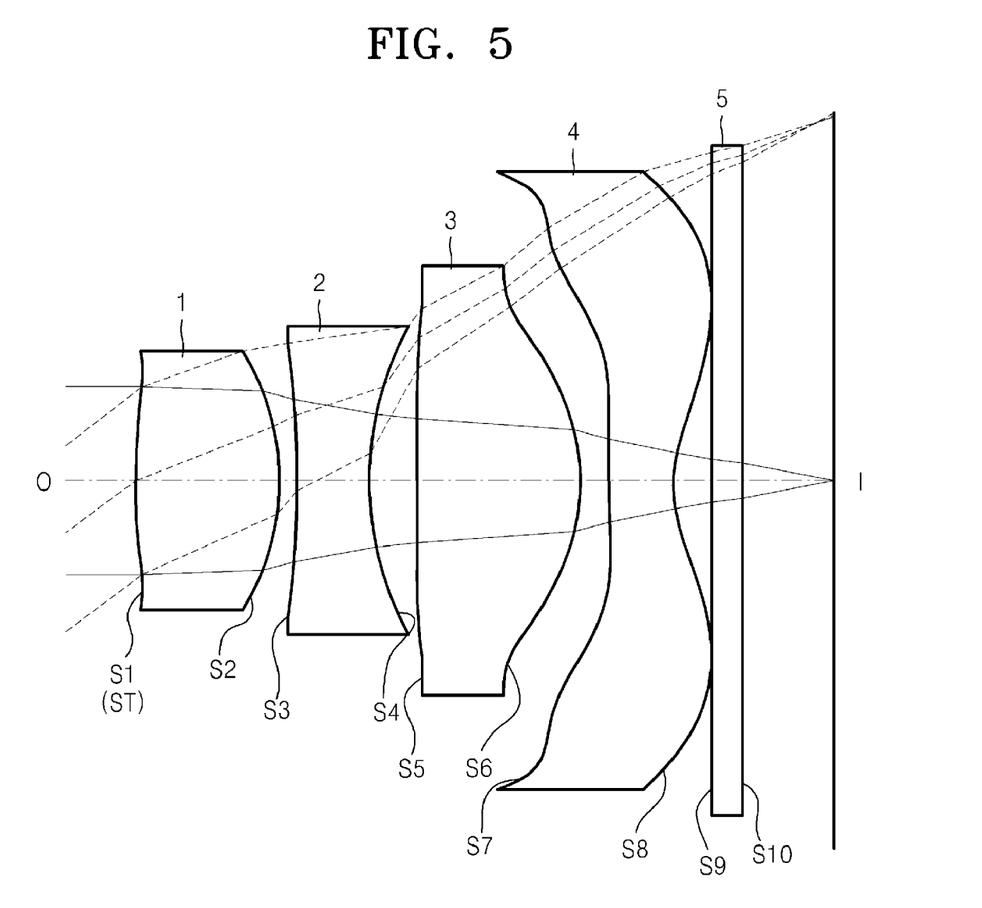
FIG. 5 is a cross-sectional view of a lens system according to another exemplary embodiment.
Figure 6:
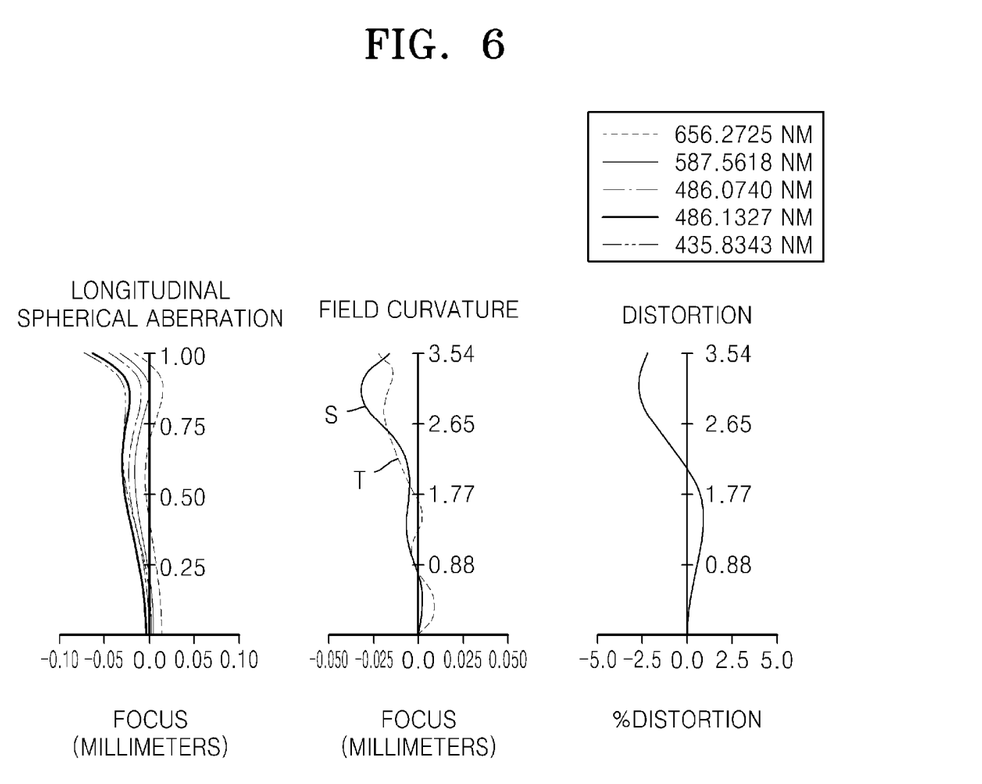
FIG. 6 is a chart illustrating longitudinal spherical aberration, field curvature, and distortion of the lens system of FIG. 5.

FIG. 5 is a cross-sectional view of a lens system according to another exemplary embodiment. FIG. 6 is a chart illustrating longitudinal spherical aberration, field curvature (including sagittal field curvature "S" and tangential field curvature "T"), and distortion of the lens system of FIG. 5. Design specifications relating to the exemplary embodiment according to FIGS. 5-6 are provided below.

Object distance: Infinity,
Focal length: 4.880 mm,
FNo: 2.69
Half viewing angle: 36.5°
Exit angle: 22.9°
Bf (Air calculation): 1.451 mm
Bf (including rear glass): 1.554 mm
T/D: 6.796/7.07=0.961

$$|L1R1|>|L2R2| \rightarrow |4.9899|>|-2.3522| \quad \text{(Equation 1)}$$

$$0.8<|L1R2|/|L2R2|<1.1 \rightarrow |-2.3522|/|2.6117|=0.901 \quad \text{(Equation 2)}$$

$$1.0<f/|f2|<2.0 \rightarrow 4.880/|-3.0480|=1.601 \quad \text{(Equation 3)}$$

$$0.7<f1/|f2|<1.1 \rightarrow 2.7599/|-3.0480|=0.905 \quad \text{(Equation 4)}$$

$$0.7<f3/|f4|<1.2 \rightarrow 3.1404/|-3.1807|=0.987 \quad \text{(Equation 5)}$$

$$v1-v2>15 \rightarrow 58.2-31.2=27.0 \quad \text{(Equation 6)}$$

$$0.9<v3/v4<1.1 \rightarrow 56.2/56.2=1.005 \quad \text{(Equation 7)}$$

|  | Radius of curvature | Interval | Refractive index | Abbe's number |
|---|---|---|---|---|
| S1(ST) | 4.98990(aspherical) | 1.4025 | 1.62263 | 58.2 |
| S2 | −2.35220(aspherical) | 0.1591 |  |  |
| S3 | −12.35680 | 0.6955 | 1.68893 | 31.2 |
| S4 | 2.61170(aspherical) | 0.4765 |  |  |
| S5 | −135.35550(aspherical) | 1.6000 | 1.53120 | 56.5 |
| S6 | −1.66140(aspherical) | 0.2642 |  |  |
| S7 | 5.65930(aspherical) | 0.6445 | 1.54353 | 56.2 |
| S8 | 1.27630(aspherical) | 0.3600 |  |  |
| S9 | INFINITY | 0.3000 | 1.51680 | 64.2 |
| S10 | INFINITY | 0.8937 |  |  |
| IMG | INFINITY | 0.000 |  |  |

Aspherical Coefficients:

S1 K: −3.329700
A: −0.150669E−01  B: −0.584417E−02  C: −0.444971E−02
D: 0.107513E−02
S2 K: −3.616000
A: −0.108622E−01  B: −0.961153E−02  C: −0.361637E−03
D: 0.000000E+00
S4 K: −2.685800
A: −0.120219E−01  B: 0.110539E−01  C: −0.247193E−02
D: 0.209823E−03
S5 K: 4934.876400
A: 0.137711E−01  B: −0.120641E−01  C: 0.603518E−02
D: −0.873777E−03
S6 K: −5.659800
A: −0.640107E−01  B: 0.359442E−01  C: −0.159063E−01
D: 0.410828E−02  E: −0.376062E−03
S7 K: −78.757300
A: −0.718044E−01  B: 0.697928E−02  C: 0.850978E−03
D: −0.106353E−03
S8 K: −4.745500
A: −0.437881E−01  B: 0.744476E−02  C: −0.104684E−02
D: 0.820349E−04  E: −.267862E−05

Figure 7:
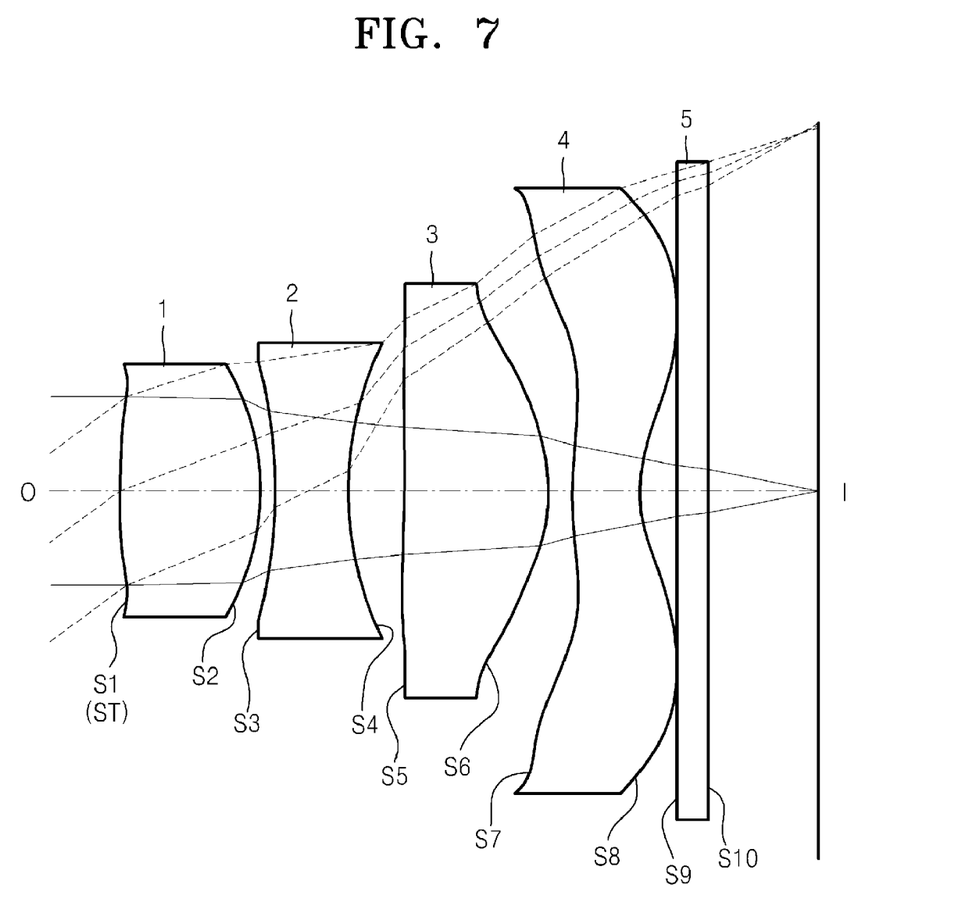
FIG. 7 is cross-sectional view of a lens system according to another exemplary embodiment.
Figure 8:
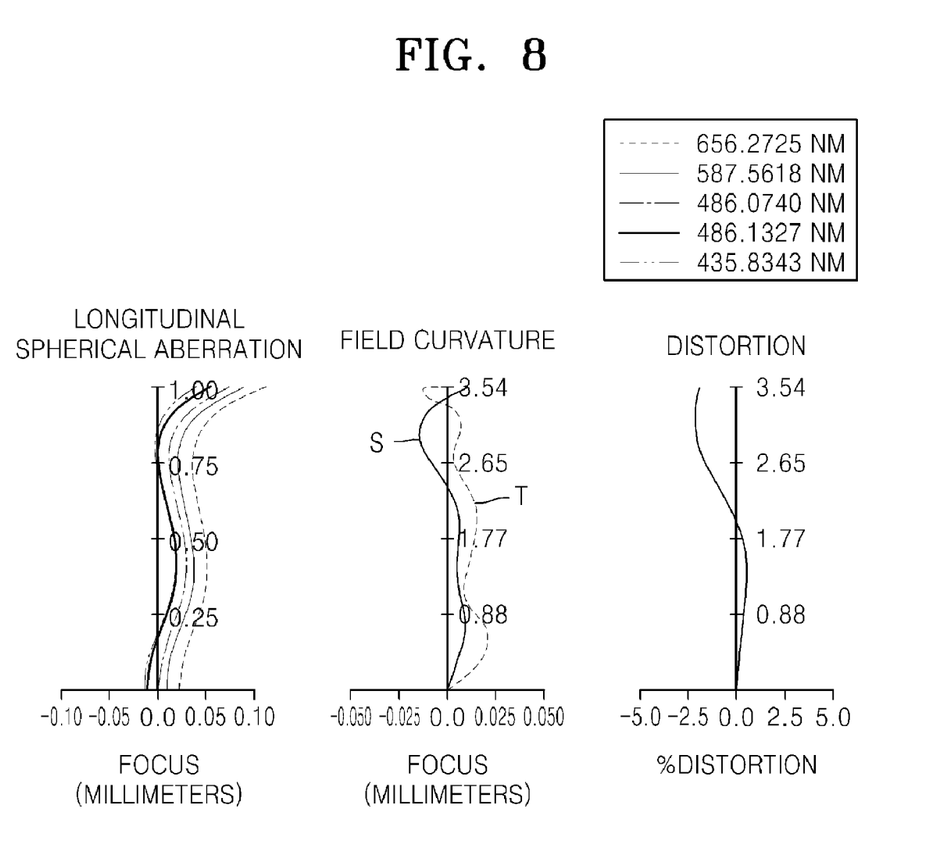
FIG. 8 is a chart illustrating longitudinal spherical aberration, field curvature, and distortion of the lens system of FIG. 7.

FIG. 7 is a cross-sectional view of a lens system according to another exemplary embodiment. FIG. 8 is a chart illustrating longitudinal spherical aberration, field curvature (including sagittal field curvature "S" and tangential field curvature "T"), and distortion of the lens system of FIG. 7. Design specifications relating to the exemplary embodiment according to FIGS. 7-8 are provided below.

Object distance: Infinity,
Focal length: 4.905 mm
FNo: 2.69
Half viewing angle: 36.3°
Exit angle: 23.3°
Bf (Air calculation): 1.634 mm
Bf (including rear glass): 1.737 mm
T/D: 6.796/7.07=0.961

$$|L1R1|>|L2R2| \rightarrow |5.1166|>|-2.6401| \quad \text{(Equation 1)}$$

$$0.8<|L1R2|/|L2R2|<1.1 \rightarrow |-2.6401|/|2.7095|=0.974 \quad \text{(Equation 2)}$$

$$1.0<f/|f2|<2.0 \rightarrow 4.905/|-2.8922|=1.696 \quad \text{(Equation 3)}$$

$$0.7<f1/|f2|<1.1 \rightarrow 2.6947/|-2.8922|=0.932 \quad \text{(Equation 4)}$$

$$0.7<f3/|f4|<1.2 \rightarrow 3.5786/|-4.2169|=0.849 \quad \text{(Equation 5)}$$

$$v1-v2>15 \rightarrow 53.2-31.2=22.0 \quad \text{(Equation 6)}$$

$$0.9<v3/v4<1.1 \rightarrow 56.5/56.5=1.0 \quad \text{(Equation 7)}$$

|  | Radius of curvature | Interval | Refractive index | Abbe's number |
|---|---|---|---|---|
| S1(ST) | 5.11660(aspherical) | 1.3650 | 1.69350 | 53.2 |
| S2 | −2.64010(aspherical) | 0.1401 | | |
| S3 | −8.58750(aspherical) | 0.7150 | 1.68893 | 31.2 |
| S4 | 2.70950(aspherical) | 0.5484 | | |
| S5 | −24.08970(aspherical) | 1.3939 | 1.53120 | 56.5 |
| S6 | −1.80430(aspherical) | 0.2400 | | |
| S7 | 3.25810(aspherical) | 0.6564 | 1.53120 | 56.5 |
| S8 | 1.23740(aspherical) | 0.3700 | | |
| S9 | INFINITY | 0.3000 | 1.51680 | 64.2 |
| S10 | INFINITY | 1.0674 | | |
| IMG | INFINITY | 0.000 | | |

Asphercial Coefficients:

S1 K: −57.611100
A: 0.323100E−01    B: −0.507497E−01    C: 0.267231E−01
D: −0.120453E−01
S2 K: −2.201600
A: −0.534685E−01    B: 0.284245E−01    C: −0.152411E−01
D: 0.152895E−02
S3 K: 23.072300
A: −0.749184E−01    B: 0.665208E−01    C: −0.268074E−01
D: 0.439402E−02
S4 K: −6.285200
A: −0.864551E−02    B: 0.149397E−01    C: −0.438745E−02
D: 0.471471E−03
S5 K: 171.883900
A: 0.268767E−01    B: −0.186107E−01    C: 0.733132E−02
D: −0.956710E−03
S6 K: −6.147400
A: −0.579609E−01    B: 0.346355E−01    C: −0.152696E−01
D: 0.389272E−02    E: −0.355606E−03
S7 K: −22.160800
A: −0.629441E−01    B: 0.678216E−02    C: 0.398692E−03
D: −0.618757E−04
S8 K: −4.496000
A: −0.463968E−01    B: 0.811532E−02    C: −0.110336E−02
D: 0.851295E−04    E: −0.283890E−05

Figure 9:
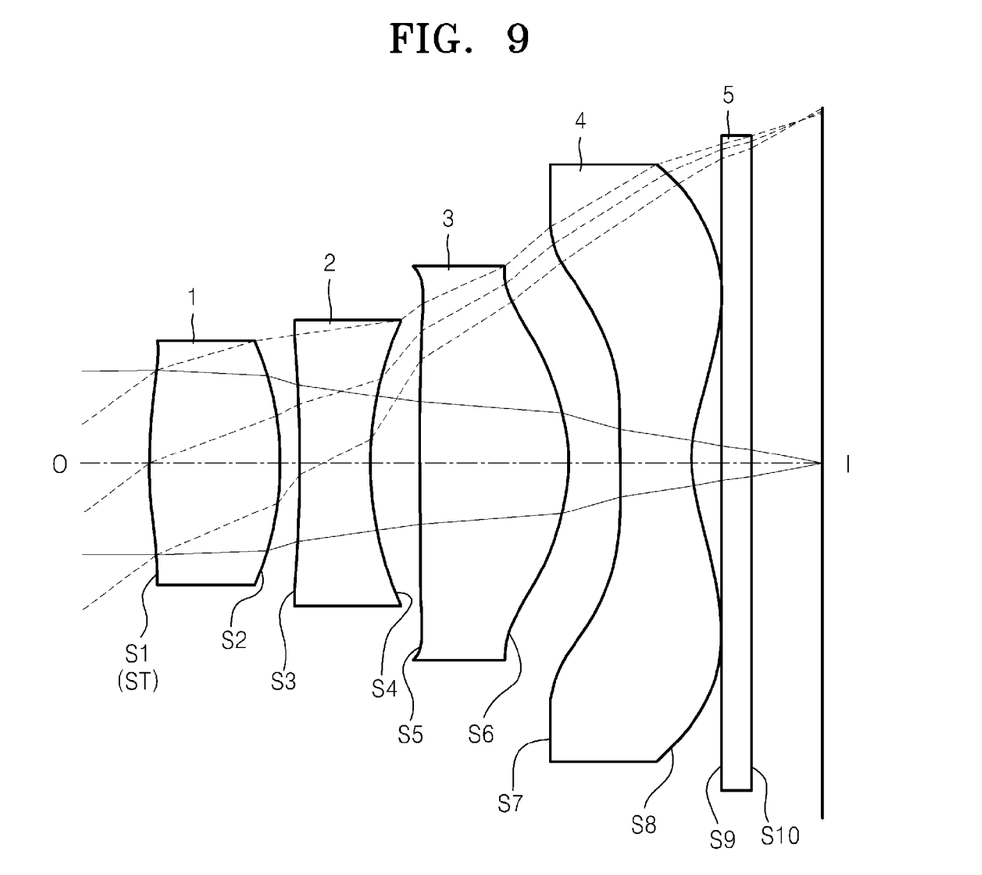
FIG. 9 is cross-sectional view of a lens system according to another exemplary embodiment.
Figure 10:
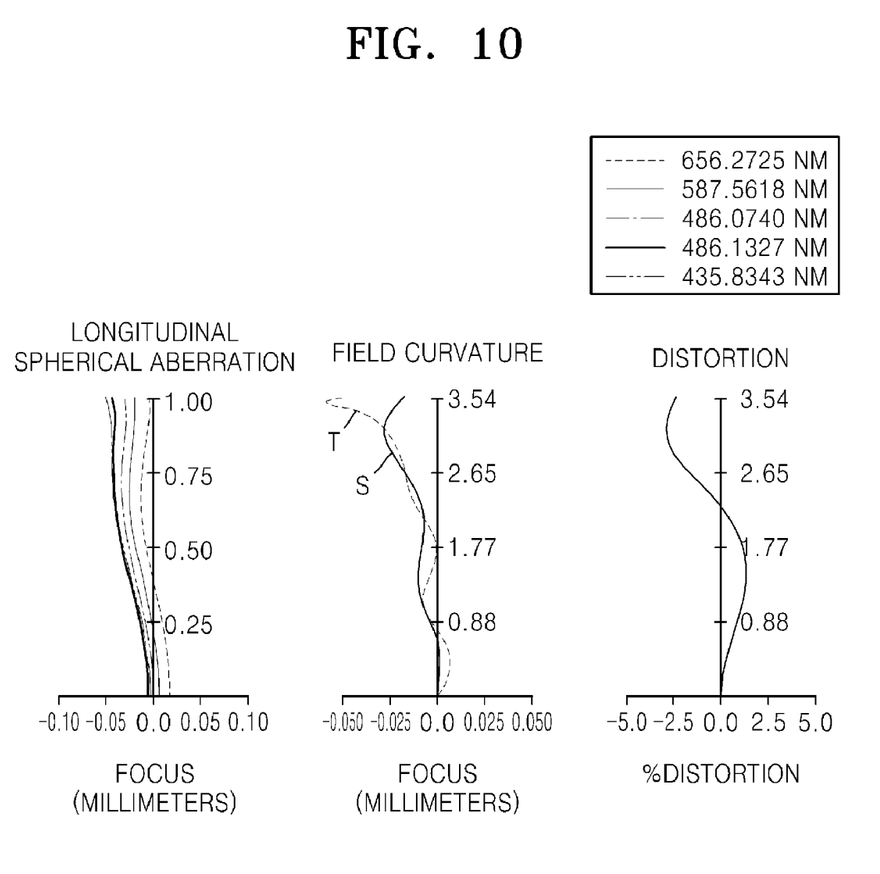
FIG. 10 is a chart illustrating longitudinal spherical aberration, field curvature, and distortion of the lens system of FIG. 9.

FIG. 9 is a cross-sectional view of a lens system according to another exemplary embodiment. FIG. 10 is a chart illustrating longitudinal spherical aberration, field curvature (including sagittal field curvature "S" and tangential field curvature "T"), and distortion of the lens system of FIG. 9. Design specifications relating to the exemplary embodiment according to FIGS. 9-10 are provided below.

Object distance: Infinity
Focal length: 4.943 mm
FNo: 2.69
Half viewing angle: 36.2°
Exit angle: 23.1°
Bf (Air calculation): 1.209 mm
Bf (including rear glass): 1.312 mm
T/D: 6.791/7.07=0.961

$$|L1R1|>|L1R2| \rightarrow |5.0915|>|-3.3684| \quad \text{(Equation 1)}$$

$$0.8<|L1R2|/|L2R2|<1.1 \rightarrow |-3.3684|/|3.4541|=0.975 \quad \text{(Equation 2)}$$

$$1.0<f/|f2|<2.0 \rightarrow 4.943/|-3.8255|=1.292 \quad \text{(Equation 3)}$$

$$0.7<f1/|f2|<1.1 \rightarrow 3.1094/|-3.8255|=0.813 \quad \text{(Equation 4)}$$

$$0.7<f3/|f4|<1.2 \rightarrow 3.6810/|-3.4227|=1.075 \quad \text{(Equation 5)}$$

$$v1-v2>15 \rightarrow 53.2-26.7=26.5 \quad \text{(Equation 6)}$$

$$0.9<v3/v4<1.1 \rightarrow 56.2/56.2=1.0 \quad \text{(Equation 7)}$$

|  | Radius of curvature | Interval | Refractive index | Abbe's number |
|---|---|---|---|---|
| S1(ST) | 5.09150(aspherical) | 1.3200 | 1.69350 | 53.2 |
| S2 | −3.36840(aspherical) | 0.1963 | | |
| S3 | −17.52550 | 0.7196 | 1.73688 | 26.7 |
| S4 | 3.45410(aspherical) | 0.4965 | | |
| S5 | 1959.24000(aspherical) | 1.4895 | 1.54353 | 56.2 |
| S6 | −2.01320(aspherical) | 0.5224 | | |
| S7 | −1111.22290(aspherical) | 0.7349 | 1.54353 | 56.2 |
| S8 | 1.87410(aspherical) | 0.3000 | | |
| S9 | INFINITY | 0.3000 | 1.51680 | 64.2 |
| S10 | INFINITY | 0.7119 | | |
| IMG | INFINITY | 0.000 | | |

Aspherical Coefficients

S1 K: −0.799500
A: −0.149322E−01    B: −0.500245E−02    C: −0.861103E−03
D: −0.855355E−03
S2 K: 1.168500
A: −0.383857E−03    B: −0.256597E−02    C: −0.165914E−02
D: 0.000000E+00
S4 K: 0.000000
A: −0.298774E−02    B: 0.390412E−03    C: 0.000000E+00
D: 0.000000E+00
S5 K: −7856527.4
A: 0.790925E−02    B: −0.107356E−01    C: 0.647100E−02
D: −0.116744E−02
S6 K: −7.270000
A: −0.673281E−01    B: 0.374893E−01    C: −0.174930E−01
D: 0.494359E−02
E: −0.487358E−03
S7 K: −2154503.9
A: −0.681047E−01    B: 0.409038E−02    C: 0.172016E−02
D: −0.176728E−03
S8 K: −4.414200
A: −0.442903E−01    B: 0.847493E−02    C: −0.128566E−02
D: 0.102141E−03    E: −0.324247E−05

As described above, according to an exemplary embodiment, a lens system that has improved resolution, proper overall length, proper exit angle, and wide angle may be provided. For example, an imaging lens system that has resolution that may correspond to a pitch of a plurality of pixels of less than 1.75 μm, T/D (which is the ratio of a diagonal dimension D of a solid state imaging device to the overall length T of the imaging lens system) of less than 1, and a very small thickness may be provided.

An imaging lens system according to an exemplary embodiment has improved resolution, may be made thin and small and thus may be applied to a small-sized optical device. An imaging lens system according to an exemplary embodiment corrects aberration properly and may be applied to a small-sized lens that is used for an electronic still camera using a solid state imaging device such as a charge coupled device (CCD) or a complementary metal-oxide semiconductor (CMOS). For example, an imaging lens system according to an exemplary embodiment may be used for, but is not limited to, a small-sized and thin mobile device such as an electronic still camera, a vehicle camera, a mobile phone, a personal digital assistant (PDA), or a PC camera.

While exemplary embodiments have been particularly shown and described, it will be understood by those of ordinary skill in the art that various changes in form and details may be made therein without departing from the spirit and scope of the present invention as defined by the following claims.

What is claimed is:

1. A lens system comprising:
a first lens of a biconvex type having two aspherical surfaces;
a second lens of a biconcave type having at least one aspherical surface;
a third lens having two aspherical surfaces and having a positive refracting power; and
a fourth lens having two aspherical surfaces and having a negative refracting power,
wherein the first lens, the second lens, the third lens, and the fourth lens are arranged sequentially from an object side of the lens system to an image side of the lens system;
wherein an aspherical surface of an image side of the fourth lens comprises an inflection point within an effective aperture range,
wherein $|L1R1|>|L1R2|$, where L1R1 is a radius of curvature of an object side of the first lens, and L1R2 is a radius of curvature of an image side of the first lens, and
wherein $0.8<|L1R2|/|L2R2|<1.1$, where L2R2 is a radius of curvature of an image side of the second lens.

2. The lens system of claim 1, wherein $1.0<f/|f2|<2.0$, where f is an overall focal length of the lens system, and f2 is a focal length of the second lens.

3. The lens system of claim 2, wherein $0.7<f1/|f2|<1.1$, where f1 is a focal length of the first lens, and
wherein $0.7<f3/|f4|<1.2$, where f3 is a focal length of the third lens, and f4 is a focal length of the fourth lens.

4. The lens system of claim 3, wherein $v1-v2>15$, where v1 is an Abbe's number of the first lens, and v2 is an Abbe's number of the second lens, and
wherein $0.9<v3/v4<1.1$, where v3 is an Abbe's number of the third lens, and v4 is an Abbe's number of the fourth lens.

5. The lens system of claim 1, wherein $v1-v2>15$, where v1 is an Abbe's number of the first lens and v2 is an Abbe's number of the second lens, and
wherein $0.9<v3/v4<1.1$, where v3 is an Abbe's number of the third lens, and v4 is an Abbe's number of the fourth lens.

6. The lens system of claim 1, wherein a stop is disposed at the object side surface of the first lens.

7. The lens system of claim 1, wherein $0.7<f1/|f2|<1.1$, where f1 is a focal length of the first lens, and f2 is a focal length of the second lens, and
wherein $0.7<f3/|f4|<1.2$, where f3 is a focal length of the third lens 3, and f4 is a focal length of the fourth lens.

8. The lens system of claim 1, wherein the lens system has a resolution corresponding to a pitch of a plurality of pixels that is less than approximately 1.75 μm.

9. The lens system of claim 1, wherein the lens system is housed in a solid state imaging device, and
wherein a ratio T/D is less than 1, where D is a diagonal dimension of the solid state imaging device and T is an overall length of the lens system.

10. The lens system of claim 9, wherein a stop is disposed at an object side surface of the first lens, and
wherein the overall length T of the lens system is a distance from a surface at a peak portion of at least one of the stop or the first lens, to a focal position of the lens system.

11. The lens system of claim 1, wherein the lens system has a back focal length of 0.95 mm or more.

12. The lens system of claim 1, wherein the lens system has a viewing angle of more than 70°.

13. An optical apparatus comprising:
a biconvex refracting element comprising two aspherical surfaces;
a biconcave refracting element comprising an aspherical surface;
a positive refracting element comprising two aspherical surfaces; and
a negative refracting element comprising two aspherical surfaces,
wherein the biconvex refracting element, the biconcave refracting element, the positive refracting element, and the negative refracting element are arranged sequentially along an optical axis, the biconvex refracting element being disposed on an object side of the optical apparatus and the negative refracting element being disposed on an image side of the optical apparatus;
wherein an aspherical surface of an image side of the fourth refracting element comprises an inflection point within an effective aperture range,
wherein $|L1R1|>|L1R2|$, where L1R1 is a radius of curvature of an object side of the biconvex refracting element, and L1R2 is a radius of curvature of an image side of the biconvex refracting element, and
wherein $0.8<|L1R2|/|L2R2|<1.1$, where L2R2 is a radius of curvature of an image side of the biconcave refracting element.

* * * * *